(12) United States Patent
Kardesler et al.

(10) Patent No.: US 11,922,463 B2
(45) Date of Patent: Mar. 5, 2024

(54) VEHICLE-MOUNTED DYNAMIC CONTENT DELIVERY SYSTEMS

(71) Applicant: FIREFLY SYSTEMS INC., San Jose, CA (US)

(72) Inventors: Onur Kardesler, San Francisco, CA (US); Alexander McCaleb, Portola Valley, CA (US); Sean Head, San Jose, CA (US); Anil Suren, Corte Madera, CA (US); Kaan Gunay, San Francisco, CA (US); Vedat Taylan Yildiz, San Mateo, CA (US)

(73) Assignee: FIREFLY SYSTEMS INC., San Jose, CA (US)

( * ) Notice: Subject to any disclaimer, the term of this patent is extended or adjusted under 35 U.S.C. 154(b) by 12 days.

(21) Appl. No.: 17/382,074

(22) Filed: Jul. 21, 2021

(65) Prior Publication Data
US 2021/0350413 A1    Nov. 11, 2021

Related U.S. Application Data

(62) Division of application No. 16/643,543, filed as application No. PCT/US2019/056542 on Oct. 16, 2019.

(Continued)

(51) Int. Cl.
| | |
|---|---|
| *G06Q 30/02* | (2023.01) |
| *G06F 3/01* | (2006.01) |
| *G06N 3/08* | (2023.01) |
| *G06Q 30/0242* | (2023.01) |
| *G06Q 30/0251* | (2023.01) |
| *G06V 40/10* | (2022.01) |

(Continued)

(52) U.S. Cl.
CPC ......... *G06Q 30/0266* (2013.01); *G06F 3/013* (2013.01); *G06N 3/08* (2013.01); *G06Q 30/0246* (2013.01); *G06Q 30/0264* (2013.01); *G06V 40/10* (2022.01); *H04W 4/23* (2018.02); *H04W 4/80* (2018.02)

(58) Field of Classification Search
CPC .......... G06Q 30/0266; G06Q 30/0246; G06Q 30/0264; H04W 4/23; H04W 4/80; G06V 40/10
See application file for complete search history.

(56) References Cited

U.S. PATENT DOCUMENTS

| | | | |
|---|---|---|---|
| 9,535,423 B1 * | 1/2017 | Debreczeni | .......... G05D 1/0278 |
| 2002/0072952 A1 * | 6/2002 | Hamzy | .............. G06Q 30/0277 |
| | | | 705/7.29 |

(Continued)

FOREIGN PATENT DOCUMENTS

WO    WO-2019070733 A1 *    4/2019    .............. A23P 30/00

*Primary Examiner* — Scott C Anderson
(74) *Attorney, Agent, or Firm* — Maschoff Brennan

(57) ABSTRACT

A method is disclosed for displaying dynamic media content on a vehicle-mounted display as the vehicle travels along a route. The dynamic content may be audio or video content, and is selected based in part on sensor data, which may pertain to contextual or environmental factors. The content may be dynamically adjusted during playback, such as by bouncing or sharply changing direction during a sudden change in velocity or acceleration. Aside from motion-related factors, other contextual and environmental factors include weather, visibility, traffic, location, and time of day.

5 Claims, 11 Drawing Sheets

Related U.S. Application Data

(60) Provisional application No. 62/747,052, filed on Oct. 17, 2018.

(51) Int. Cl.
*H04W 4/23* (2018.01)
*H04W 4/80* (2018.01)

(56) References Cited

U.S. PATENT DOCUMENTS

| | | | | |
|---|---|---|---|---|
| 2006/0256133 | A1* | 11/2006 | Rosenberg | G06F 3/013 |
| | | | | 345/619 |
| 2016/0358393 | A1* | 12/2016 | Penland | G08B 13/19652 |
| 2017/0228762 | A1* | 8/2017 | Riviello | G06Q 30/0273 |
| 2017/0364945 | A1* | 12/2017 | Juhasz | G06Q 30/0246 |
| 2018/0020247 | A1* | 1/2018 | Zhang | G06Q 30/02 |
| 2018/0260871 | A1* | 9/2018 | Harvill | G06F 16/9038 |
| 2018/0299883 | A1* | 10/2018 | Terzian | G06Q 30/02 |
| 2018/0343430 | A1* | 11/2018 | Schmit | H04N 23/45 |

* cited by examiner

FIG. 5

VEHICLE-MOUNTED DYNAMIC CONTENT DELIVERY SYSTEMS

CROSS-REFERENCE

This application is a divisional application of U.S. patent application Ser. No. 16/643,543, filed Feb. 29, 2020, which is a national stage entry of International Patent Application No. PCT/US2019/056542, filed Oct. 16, 2019, which claims priority to U.S. Provisional Patent Application No. 62/747,052, filed on Oct. 17, 2018. The contents of these applications are incorporated herein by reference in their entirety.

BACKGROUND

For decades, billboards have been erected to display content to drivers of vehicles on major roads. Displaying content on billboards makes it possible for hundreds of thousands of people to see the content daily.

Billboards may be installed at various locations, such as highways, roads or on buildings. The content of billboards may be changed on a periodic basis.

SUMMARY

As compared to stationary billboards, potentially even more people may be reached by displaying content on mobile billboards, such as displays mounted to trucks, trains, or other vehicles. Much of the content displayed on these billboards may not be targeted to specific demographics and may not be adjusted dynamically in response to external factors. Thus, many audiences may not be receptive to this displayed content.

Displaying dynamically adjustable, targeted content on vehicle-mounted display may be beneficial to content providers, as it may be possible to find many different audiences receptive to dynamically adjusted content along a traveled route.

In an aspect, a method for displaying media content on a vehicle is disclosed. The method comprises providing the vehicle comprising a display screen on an exterior portion of the vehicle, dynamically selecting the media content while the vehicle is travelling along a route, and displaying the media content dynamically selected in (b) on the display screen.

In some embodiments, the display screen is part of a display unit mounted on the exterior portion of the vehicle, where the display unit comprises one or more members selected from the group consisting of a global positioning system (GPS), a wireless transmitter, a wireless receiver, an optical sensor, an audio sensor, an accelerometer, and a gyroscope.

In some embodiments, the optical sensor is a camera or video unit.

In some embodiments, the optical sensor is a particle sensor.

In some embodiments, the media content is dynamically selected at least in part on (i) a speed, velocity or acceleration of the vehicle along a route, or (ii) contextual or environmental factors along the route.

In some embodiments, the contextual factors include a geographic location of the vehicle along the route.

In some embodiments, the contextual factors include a time of day in which the vehicle is travelling the route.

In some embodiments, the environmental factors include traffic conditions or ambient lighting along the route.

In some embodiments, the vehicle comprises a roof rack, and providing the vehicle with the display screen comprises fixing the display screen to the roof rack.

In some embodiments, the environmental factors include weather conditions along the route.

In some embodiments, the contextual factors include places of interest along the route.

In some embodiments, places of interest include apartments, hotels, museums, parks, shopping centers, restaurants, and bars.

In some embodiments, the contextual factors include entertainment events happening in a vicinity of the route.

In some embodiments, wherein along the route, the vehicle undergoes a change in velocity or acceleration, and wherein the media content is dynamically adjusted in response to the change in velocity or acceleration.

In some embodiments, along the route, the vehicle stops.

In some embodiments, the method further comprises using a sensor to collect audio or video data along the route and using the audio or video data to dynamically select the media content.

In some embodiments, the sensor captures a multi-angle video of conditions along the route.

In some embodiments, the conditions are route conditions.

In some embodiments, the method further comprises using a sensor to collect geographic data along the route and using the geographic data to dynamically select the media content.

In some embodiments, the method further comprises using one or more sensors to collect environmental data.

In some embodiments, the environmental data includes data indicative of visibility along the route.

In some embodiments, the method further comprises adjusting the media content in response to the change in visibility.

In some embodiments, the method further comprises determining one or more environmental conditions from the environmental data and adjusting the media content in response to the environmental conditions.

In some embodiments, the one or more environmental conditions includes air pollution or light pollution.

In some embodiments, the method further comprises logging information along the route.

In some embodiments, the method further comprises logging demographic information along the route.

In some embodiments, the demographic information includes a number of passengers along the route.

In some embodiments, the demographic information includes video of pedestrian or vehicle traffic along the route.

In some embodiments, the content is dynamically selected using a machine learning algorithm.

In another aspect, a system for displaying media content on a vehicle is disclosed. The system comprises a display screen mountable on an exterior portion of the vehicle and a controller operatively coupled to the display screen, wherein the controller is programmed to (i) dynamically select the media content while the vehicle is travelling along a route; and (ii) direct the media content dynamically selected in (i) to be displayed on the display screen.

In some embodiments, the controller is programmed to dynamically select the media content based at least in part on (i) a speed, velocity or acceleration of the vehicle along a route, or (ii) contextual or environmental factors along the route.

In some embodiments, the method further comprises a sensor for collecting audio or video data along the route.

In some embodiments, the sensor is a multi-angle camera.

In some embodiments, the system further comprises further comprising a logging module for storing information collected along the route.

In some embodiments, the system further comprises further comprising a sensor for determining the velocity and acceleration of the vehicle along the route.

In some embodiments, the media content is selected from content stored on an online portal.

In some embodiments, the online portal is configured to permit content providers to upload content.

In some embodiments, the online portal is configured to permit content providers to choose a time interval in which to display content.

In some embodiments, the online portal is configured to permit content providers to choose how often the content is played back.

In some embodiments, the online portal allows content providers to choose a bounded area in which media content playback occurs.

In some embodiments, the system communicates with connected devices using Wi-Fi and Bluetooth.

In another aspect, the present disclosure provides a method for determining an impression. The method can comprise (a) displaying media content on a screen during a first time period; (b) obtaining, using a camera, video of a subject adjacent to the screen; and (c) processing the video, using a gaze-tracking algorithm, to determine whether the subject looked at the screen during the time period.

In some embodiments, the media content can be an advertisement.

In some embodiments, the screen can be disposed on a vehicle.

In some embodiments, the camera can be integrated into the screen.

In some embodiments, the gaze-tracking algorithm can comprise a machine learning algorithm. The machine learning algorithm can comprise a convolutional neural network. Alternatively, the gaze-tracking algorithm can use geometric techniques.

In some embodiments, the method can further comprise, using a facial model, determining an emotional reaction of the subject to the advertisement.

In some embodiments, the method can further comprise selecting second media content to display on the screen during a second time period. The selecting can comprise considering the emotional reaction of the subject to the advertisement.

In some embodiments, the method can further comprise repeating (a) to (c) for a plurality of subjects other than the subject and computing an impression rate for the media content.

In another aspect, the present disclosure provides a method for determining a rate of engagement by a target group. The method can comprise (a) displaying media content on a display screen at a first time at a first location and (b) determining, using mobile phone data, one or more subjects who were within a specified distance of the first location at the first time. The one or more subjects can comprise the target group. The method can further comprise (c) tracking, using the mobile phone data, a subset of the target group to a second location indicative of an engagement associated with the media content; and (d) determining the rate of engagement by processing a size of the subset and a size of the target group.

In some embodiments, the display screen can be on or mounted to a vehicle.

In some embodiments, the tracking can be performed within a specified time of the first time.

In some embodiments, the specified time can be at most one week.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 5 shows an analytics portal that may allow content providers to receive data about content presentation statistics;

DETAILED DESCRIPTION

Figure 1:
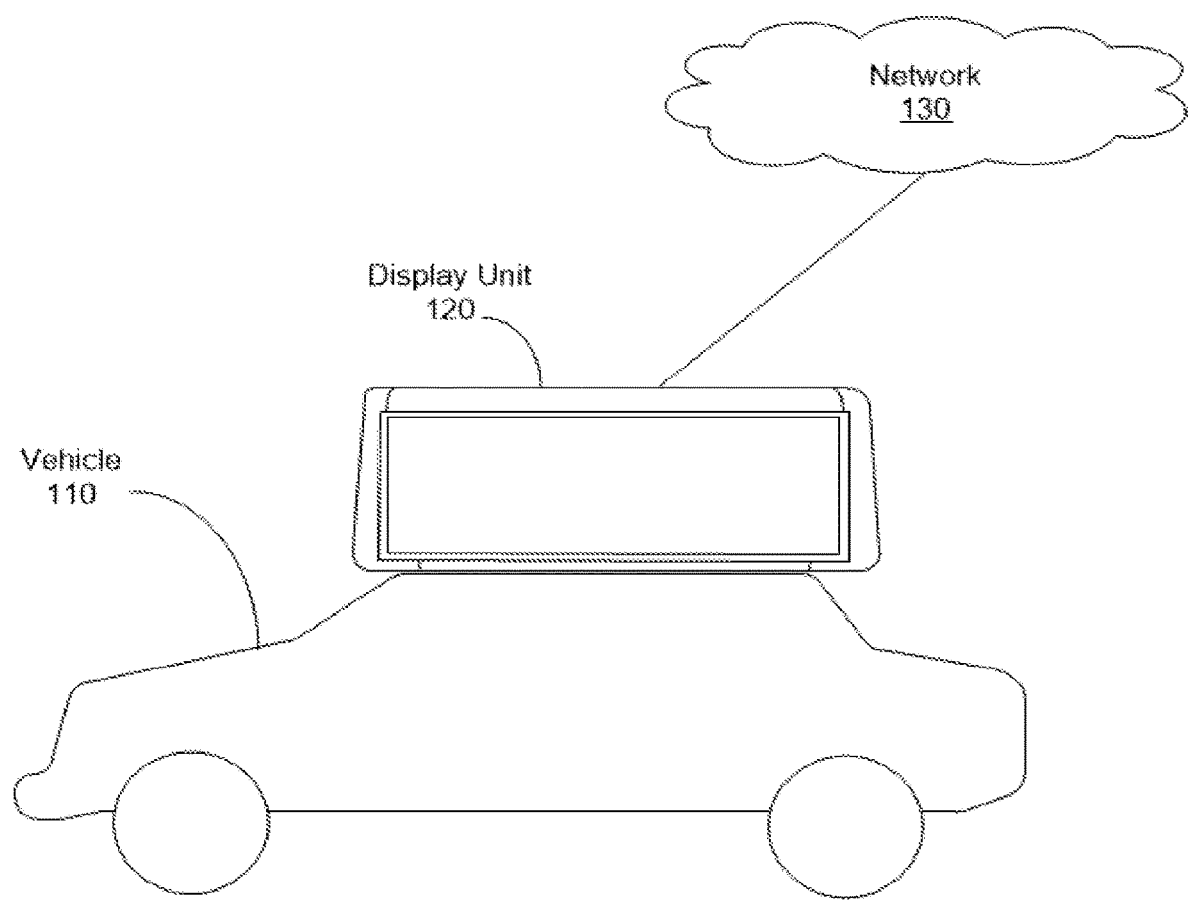
FIG. 1 schematically illustrates an example of a system for displaying media content on a vehicle.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "media content," as used herein, generally refers to visual and/or audio content for broadcast. The media content may be an image, audio, or video. Examples of media content include advertising content, alerts, and information material.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Systems and Methods for Displaying Media Content on a Vehicle

An aspect of the present disclosure provides methods for displaying media content on a vehicle. A method for displaying media content on a vehicle may comprise providing the vehicle comprising a display screen on an exterior portion of the vehicle. Next, the media content may be dynamically selected while the vehicle is travelling along a route. Next, the media content dynamically selected may be displayed on the display screen.

The display screen may be part of a display unit mounted on the exterior portion of the vehicle. The display unit may comprise one or more members selected from the group consisting of a global positioning system (GPS), a wireless transmitter, a wireless receiver, an optical sensor, an audio sensor, an accelerometer, and a gyroscope. The optical sensor may be a camera or video unit. As an alternative or in addition to, the optical sensor may be an infrared sensor or an ultraviolet sensor. The optical sensor may be a particle sensor (e.g., a sensor for measuring particles, such as a soot or pollution sensor). The wireless receiver may allow the display screen to computing devices in a local area. In some instances, the wireless receiver may allow the display unit to download content from one or more connected computing devices, in order to obtain data to provide instructions for the display unit to dynamically adjust or select media content.

The media content may be dynamically selected at least in part on the speed, velocity or acceleration of the vehicle along a route, or contextual or environmental factors along the route. The contextual factors may include a geographic location (or geolocation) of the vehicle along the route. The contextual factors may also include a time of day in which the vehicle is travelling the route. The environmental factors may include traffic conditions or ambient lighting along the route. The environmental factors may also include weather conditions along the route. The contextual factors may also include places of interest along the route. The places of interest may include apartments, hotels, museums, parks, shopping centers, restaurants, and bars. The contextual factors may also include entertainment events happening in a vicinity of the route.

Along the route, the vehicle may undergo a change in velocity or acceleration. The media content may be dynamically adjusted in response to the change in velocity or acceleration. Along the route, the vehicle may stop. The content may be adjusted by adopting a faster or slower framerate or rate at which media content is cycled or adjusting its motion in response to the changes in velocity or acceleration, according to events received by an accelerometer or a gyroscope. The display unit may display videos that are shorter in duration or static images when the vehicle moves at a faster speed and play longer content when the vehicle is at a standstill.

The media content may be selected and/or adjusted, and displayed on the display screen automatically without any involvement from a user. As an alternative, the media content may be selected by a user (e.g., through a mobile device of the user in communication with the display screen) and display upon request from the user. The user may be a driver of the vehicle, a remote user, or a passenger of the vehicle.

A sensor may be used to collect audio or video data along the route, and the audio or video data may be used to dynamically select the media content. The sensor may capture a multi-angle video of conditions along the route. The conditions may be route conditions. Further, the display unit may use a sensor to collect geographic data along the route and use the geographic data to dynamically select the media content. Route conditions may include vehicle traffic, pedestrian traffic, visibility, route topography (e.g., hilly, flat, winding roads, dirt road, one-way street), lighting, weather, climate, road conditions, traffic accidents, or other events or conditions external to the vehicle.

The one or more sensors may be used to collect environmental data. The environmental data may include data indicative of visibility along the route. The media content may be adjusted in response to the change in visibility.

One or more environmental conditions may be determined from the environmental data, and the media content may be adjusted in response to the environmental conditions. One or more environmental conditions may include air pollution or light pollution.

Information may be logged along the route, as data is collected from different sources as the vehicle travels along the route. Data may be collected by sensors or by devices that connect to the display unit over a network, such as a WiFi network or a cellular network.

Demographic information may be logged along the route. The logged demographic information may include a number of passengers along the route. The demographic information may include video of pedestrian or vehicle traffic along the route.

The content may be dynamically selected using a machine learning algorithm. For example, a machine learning algorithm may be used to predict the route a vehicle will travel, based on past traveling history. Content may then be allocated by the display unit in response to the predicted route.

Example algorithms used may include logistic regression, linear regression, decision trees, and neural networks.

Another aspect of the present disclosure provides systems for displaying media content on a vehicle. A system for displaying media content on a vehicle may comprise a display unit mountable on an exterior portion of the vehicle. The display unit may include a controller operatively coupled to a display screen. The controller may be programmed to dynamically select the media content while the vehicle is travelling along a route; and may also direct the media content dynamically selected to be displayed on the display screen.

The controller may be programmed to dynamically select the media content based at least in part on a speed, velocity or acceleration of the vehicle along a route, or contextual or environmental factors along the route.

The system may include a sensor for collecting audio or video data along the route and the audio or video data may be used to dynamically select the media content. The sensor may be a camera that captures a multi-angle video of conditions along the route. The conditions may be route conditions. Further, the display unit may use a sensor to collect geographic data along the route and use the geographic data to dynamically select the media content. Route conditions may include vehicle traffic, pedestrian traffic, visibility, route topography (e.g., hilly, flat, winding roads, dirt road, one-way street), lighting, weather, climate, road conditions, traffic accidents, or other events or conditions external to the vehicle.

The system may include a logging module for storing information collected along the route. The logging module may be a database or data structure. Such information can include passenger information, route information, and/or weather information.

The system may also include a sensor for determining the velocity and acceleration of the vehicle along the route. Further, the system may use a sensor to collect geographic data along the route and use the geographic data to dynamically select the media content. Route conditions may include vehicle traffic, pedestrian traffic, visibility, route topography (e.g., hilly, flat, winding roads, dirt road, one-way street), lighting, weather, climate, road conditions, traffic accidents, or other events or conditions external to the vehicle.

The one or more sensors may be used to collect environmental data. The environmental data may include data indicative of visibility along the route. The media content may be adjusted in response to the change in visibility.

One or more environmental conditions may be determined from the environmental data, and the media content may be adjusted in response to the environmental conditions. One or more environmental conditions may include air pollution or light pollution.

Information may be logged along the route, as data is collected from different sources as the vehicle travels along the route. Data may be collected by sensors or by devices that connect to the display unit over a network, such as a Wi-Fi network or a cellular network.

Demographic information may be logged along the route. The logged demographic information may include a number of passengers along the route. The demographic information may include video of pedestrian or vehicle traffic along the route.

The media content displayed on the display screen may be selected from content stored on an online portal. The online portal may allow content providers to upload content for playback on the display unit's display screen. The content providers may be allowed to choose a time interval in which to display the uploaded content. The content providers may select a time interval that allows them to target a specific audience. For example, content displayed after midnight near bars may relate to local hotels. The online portal may also allow content providers to choose how often the content is replayed during the time interval. The content providers may be charged additionally for more plays of their content. The online portal may allow content providers to choose a bounded geographic area in which media content playback occurs. The area may be a square, triangular, or arbitrarily-shaped area. The area may be adjusted by the content provider before or during content presentation. The online portal also may allow content providers to collect data about their content as it is being displayed, including data regarding how many impressions the content receives from being displayed to external audiences.

The system may allow users to communicate with connected devices using Wi-Fi and Bluetooth. The system may connect to external devices, such as computing devices, and collect data from these devices over a network. This data may be combined with sensor data to select content for presentation. For example, the system may passively connect data from connected mobile phones including device identifiers and location information. The system may collect location information from Bluetooth Low Energy (BLE) beacons, in densely populated areas GPS information is unavailable or unreliable due to occlusions. The system may allow drivers and passengers to connect using an application and may receive demographic data from the drivers and passengers. The system may be able to stream audio content from a connected Bluetooth device, and play the audio content for one or more external audiences.

FIG. 1 schematically illustrates an example of a system 100 for displaying media content on a vehicle 110. The system 100 includes a vehicle, a display unit 120 mounted to the vehicle, and a network. The display unit is mounted on a roof of the vehicle 110. However, the display unit 120 may be mounted on other locations of the vehicle 120, such as, for example, a side or rear of the vehicle 120. As an alternative or in addition to, the display unit 120 may be integrated into a door or panel of the vehicle 120.

The display unit 120 may be mounted to the vehicle 110 using various approaches. For example, the display unit 120 is mounted to the roof of the vehicle 10 using two straps on opposing ends along a length of the display unit 120. As an alternative or in addition to, adhesive applied to a base of the display unit 120 may be used to secure the display unit 120 to the roof of the vehicle 110.

The system 100 may have at least 1, 2, 3, 4, 5, 6, 7, 8, 9, 10 or more display units. The display units may be of the same size or different sizes.

A display unit may have a width of at least about 0.1 meters (m), 0.2 m, 0.3 m, 0.4 m, 0.5 m, 0.6 m, 0.7 m, 0.8 m, 0.9 m, 1 m, 2 m, 3 m, 4 m, 5 m, 10 m, or greater. The display unit may have a width less than or equal to about 10 m, 5 m, 4 m, 3 m, 2 m, 1 m, 0.9 m, 0.8 m, 0.7 m, 0.6 m, 0.5 m, 0.4 m, 0.3 m, 0.2 m, 0.1 m, or less. The display unit may have a height of at least about 0.1 m, 0.2 m, 0.3 m, 0.4 m, 0.5 m, 0.6 m, 0.7 m, 0.8 m, 0.9 m, 1 m, 2 m, 3 m, 4 m, m, 10 m, or greater. The display unit may have a height less than or equal to about 10 m, 5 m, 4 in, 3 m, 2 m, 1 m, 0.9 m, 0.8 m, 0.7 m, 0.6 m, 0.5 m, 0.4 m, 0.3 m, 0.2 m, 0.1 m, or less. The display unit may have a length of at least 0.1 m, 0.2 m, 0.3 m, 0.4 m, 0.5 m, 0.6 m, 0.7 m, 0.8 m, 0.9 m, 1 m, 2 m, 3 m, 4 m, 5 m, 10 m, or greater. The display unit may have a length less than or equal to about 10 m, 5 m, 4 m, 3 m, 2 m, 1 m, 0.9 m, 0.8 m, 0.7 m, 0.6 m, 0.5 m, 0.4 m, 0.3 m, 0.2 m, 0.1 m, or less.

The vehicle 110 may be a land vehicle, such as a car, train, truck, van, or bus, and also may be an airborne or seaborne vehicle, such as an airplane, helicopter, blimp, unmanned aerial vehicle (UAV), ship, or boat. The vehicle may be an autonomous or semi-autonomous vehicle. The vehicle 110 may be a personal vehicle, a taxicab, a self-driving vehicle, or a public or mass transportation vehicle. The vehicle 110 may transport passengers or cargo along a route and may allow the display unit to display media content and/or collect information along the route.

The display unit 120 may be mounted to the vehicle and displays dynamic media content to external audiences. The display unit may be purchased by, rented by, or leased to an owner or driver of the vehicle 110. The display unit 120 may be mounted on top, on the side, or above the trunk or license plate of the vehicle 110. The display unit may be stationary or may rotate in place.

The network 130 may connect to the display unit 120 and may enable the display unit 120 to interface with other network-connected devices. These network-connected devices may include, for example, computing devices, such as mobile phones, tablets, and desktop or laptop computers. For example, the display unit 120 may connect to a mobile device owned by the driver of the vehicle, in order for the driver to log information about the traveled route or to passively collect data from the driver's mobile device. The display unit may also passively collect data from other connected computing devices, or position information from devices such as Wi-Fi beacons. The network 130 may be a cellular network, a Wi-Fi network, or another type of network.

Figure 2A:
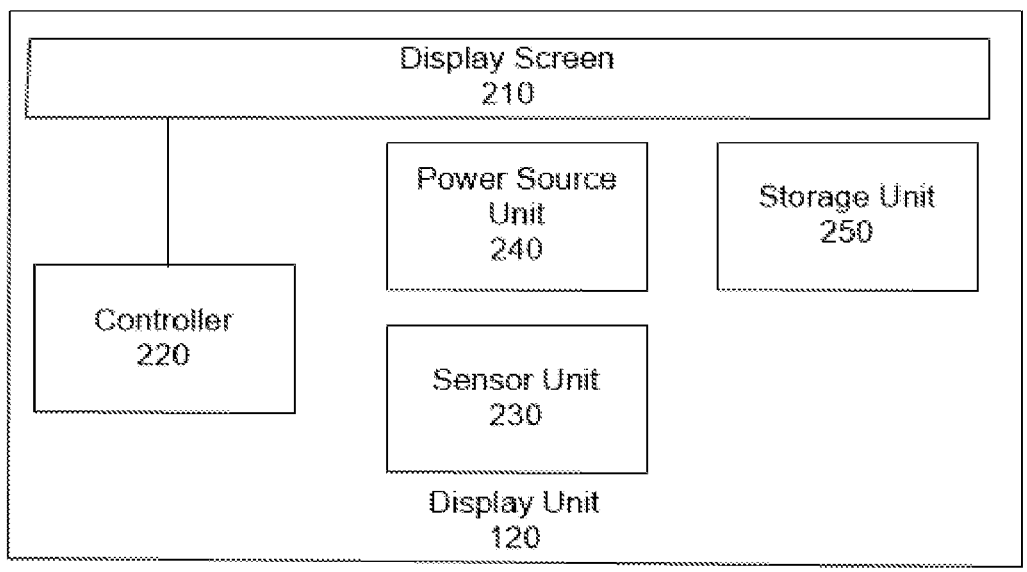
FIG. 2A schematically illustrates a display unit.

FIG. 2A schematically illustrates the display unit 120 from FIG. 1. The display unit 120 may include a display screen 210 mountable on an exterior portion of the vehicle, a controller 220 operatively coupled to the display screen 210, a power source unit 240, a sensor unit 230, and a storage unit 250.

The display screen 210 may display dynamic content to an audience that is positioned outside of the vehicle itself (e.g., on a sidewalk along the route). The displayed content may be dynamically selected responsive to data collected regarding contextual or environmental conditions. Contextual and environmental conditions may include the time of day, the amount of traffic, the acceleration and velocity of the vehicle, the amount of air and light pollution, and other factors observed along the vehicle's traveled route. The display unit may be programmed to display graphic image or video content in response to the contextual or environmental conditions. The display screen 210 may be a liquid crystal (LCD) display device, a flat panel cathode ray tube (CRT), a thin film transistor (TFT) display device, a plasma device, or another type of electronic display device.

The controller 220 may direct the playback of media content on the display screen. The controller may be a general-purpose computer or a mobile device running a mobile operating system. Alternatively, the controller may be an integrated circuit device such as a processor, microcontroller, Application-Specific Integrated Circuit (ASIC) device, or a Field Programmable Gate Array (FPGA) device capable of executing instructions contained in one or more software programs. The controller 220 may be integrated with a sensor unit 230 including one or more sensors that collect data regarding environmental or contextual conditions. For example, the controller may be integrated with a sensor unit 230 including one or more of a global positioning system (GPS), a media sensor, an accelerometer, a gyroscope, a microphone, or another type of sensor. The sensor unit 230 may include storage to log sensor data. The sensor data 230 may also upload sensor data to an external server, such as a cloud server. The sensor data may be made accessible to the controller 220, in order to allow the controller 220 to select media content for presentation on the display screen 210.

The controller 220 may select content for presentation from the storage unit 250, in response to the collected data regarding environmental or contextual conditions. The storage unit 250 may be a memory unit that is co-located with the controller 230 on the same device. Alternatively, the storage unit may be located on a different device. The storage unit 250 may be a Random-Access Memory (RAM) device, a Read Only Memory (ROM) device, a flash memory device, or another type of storage device.

Alternatively, the controller 220 may stream content from a remote server. The controller may connect to this server using Wi-Fi or a cellular network, such as a 3G or 4G cellular broadband network. The server may be a web server from which publicly available content may be streamed, or a private server.

The power source unit 240 provides power to the components of the display unit. The power source unit 240 may be a battery, such as a lithium-ion battery, a set of AA batteries, or a set of AAA batteries. The power unit may receive power from a vehicle battery and alternator.

Figure 2B:
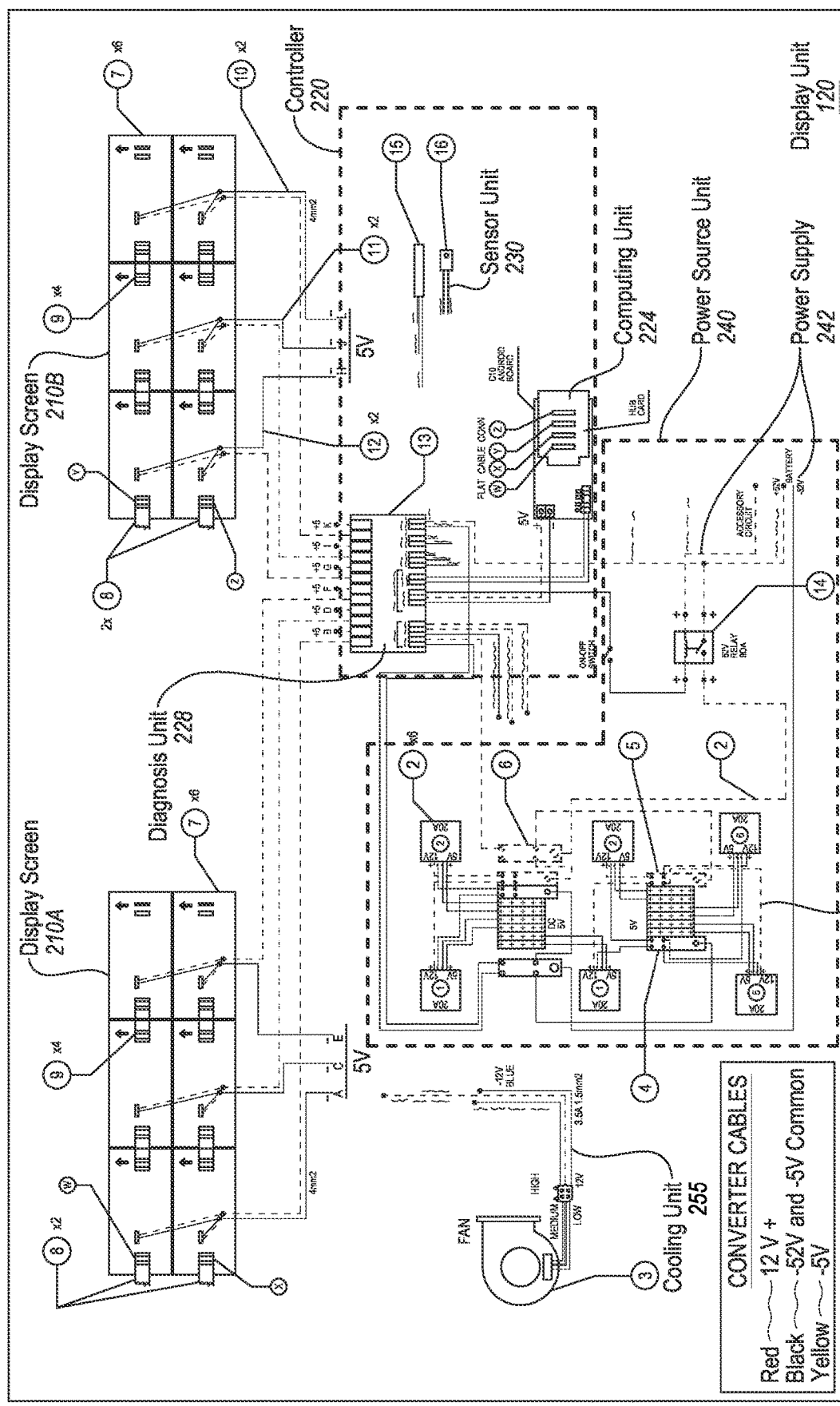
FIG. 2B schematically illustrates a circuit diagram of the display unit.

FIG. 2B schematically illustrates a circuit diagram of the display unit 120. In FIG. 2B, two display screens 210A and 210B are shown, as well as the controller 220, the power source unit 240, a cooling unit 255, and the sensor unit 230. Although two display screens are included in the figure, the display unit may have one display screen or more than two display screens. Components of the display unit circuit may be printed on one or more printed circuit boards (PCBs).

The power source unit 240 provides power to the display unit 120 and directs the provided power to the components within the display unit 120. The power source unit 240 includes a power supply 242 and a power distribution unit 244. The power source unit 240 may provide the components with direct current (DC) voltage.

The power supply 242 may supply power to the components of the display unit 120. The power supply may be a battery. The power supply may supply, for example, a symmetric voltage of +/−12 V DC. The power supply 242 may include the battery and the alternator of the vehicle 110. The power supply 242 also may include an on/off switch connected to an accessory circuit. The accessory circuit may, for example, be supplied power through an accessory source such as the car cigarette lighter and may supply 12 V DC. The accessory circuit may also include a relay, which may turn on when power is supplied through the accessory source and may stay off when power is not supplied through the accessory source. The accessory circuit may also include an on/off switch, which breaks the connection and shuts off power to the rest of the display unit 120.

The power distribution unit 244 may direct the power from the power supply 242 to the other components of the display unit 120 using a plurality of wires and terminal blocks. The power distribution unit 244 may contain one or more DC converters to lower or raise the voltage supplied by the power supply 242, depending on the voltages required by the components of the display unit 120. For example, a car battery power supply may supply a system with a DC symmetric voltage of +/−12 volts. But individual components of the display unit 120 may only be rated for +/−5 volts of DC symmetric voltage. The power distribution unit 244 may use one or more terminal blocks to connect the components of the display unit 120 to the power supply. The terminal blocks fasten wires to terminals on the displays 210A and 210B in order to supply potential differences to the displays. The terminal blocks may enable each sub-display to receive 10 V (+5/−5 symmetric) from the power source unit 240. To hold a wire in place, a terminal block may use a spring-cage connection, in which the connecting wire is enclosed in a cage that is secured using a spring, a screw connection, in which the wire is held in place using a screw, a hybrid connection including screw and spring connections, or another type of connection.

Wires may supply a symmetric DC voltage of +/−12 V to the power distribution unit. The DC converters may lower the supplied voltage to +/−5 V. Then, the terminal blocks supply voltages of 10 V to each sub-display. The terminals receiving +5 V, in the circuit diagram, are B, D, F, G, I, and K. The terminals receiving −5 V (the ground terminals) are (A, C, E, H, J, and, L).

The display screens 210A and 210B may use LEDs to present content to one or more external audiences along the route. The display screens 210A and 210B may comprise multiple sub-displays. A sub-display may have a terminal, through which the sub-display may receive power serially from the power distribution unit 244. The display screens 210A and B may receive the power after one or more DC converters raise or lower the voltage output from the power supply unit 242. For example, each sub-display may receive 10 V (+/−5 V symmetric) from the power distribution unit 244, and the display screens may comprise 12 sub-displays, which each receive 5 V from the power source 240. The display screens 210A and 210B may receive content for presentation serially from a computing device, such as a mobile phone, laptop, or tablet.

In FIG. 2B, the input terminals in each of the sub-displays are labeled B, D, F, G, I, and K, and receive the voltage supplied by the power distribution unit 244. The ground terminals are labeled A, C, E, H, J, and, L. The 12 sub-displays are arranged in a 6×2 grid but may be arranged in another configuration. For example, the 12 sub-displays may be arranged as a 12×1 grid, a 4×1grid, or a 3×4 grid. There may be more than 12 sub-displays, depending on the size of the sub-displays used. The LEDs used in the displays 210A and 210B may be, for example, SMD 2020 LEDs.

The cooling unit 255 prevents the display unit 120 from overheating. The cooling unit may include one or more heat sinks, fans, liquid cooling devices, heat pipes, or other cooling devices. A cooling unit fan may be able to operate at one or more speeds when the power source unit 240 supplies a voltage to the fan. For example, the fan may be able to operate at a fast speed or a medium speed. The fan may indicate its speed using one or more LEDs or other visual aids. For example, the fan may indicate a fast speed with a red LED, a medium speed with an orange LED, or that it is turned off with a blue LED.

The controller 220 may direct content to the display screens 210A and 210B for presentation and may adjust the presented content in response to received data from one or more sensors from a sensor unit 230. The controller 220 may include a computing unit 224 and a diagnosis unit 228.

The sensor unit 230 may include one or more sensors that collect data, such as environmental data and context data. The circuit diagram includes a temperature sensor and a light sensor, but the sensor unit 230 may include other sensors, including one or more of a particle sensor, an air pollution sensor, a humidity sensor, a microphone or noise meter, a gyroscope, a GPS, an accelerometer, a camera, a radar system, a light detection and ranging (LIDAR) system, or the like. As sensors collect data, they may place the data into one or more discrete groups, based on defined ranges of data values. For example, a temperature sensor may group temperatures above 60 F into a "high" temperature bucket and temperatures below 60 F into a "low" temperature bucket. A light sensor may group measurements of more than 1000 lux as "bright" and of less than 1000 lux as "dark". A light sensor may use one or more LEDs to provide a visual representation of the data it receives. For example, the temperature sensor may use a black LED to signify a cold temperature, a yellow LED to signify a mild temperature, and a red LED to signify a hot temperature. The light sensor may have green and white LEDs, for signifying ambient darkness and ambient lightness, respectively.

The data collected by the sensors in the sensor unit 230 can be shared with municipalities or sold to third-parties. For example, municipalities may be interested in obtaining micro-climate and air pollution data so that they can issue severe weather or air quality alerts. Ride-share and autonomous vehicle companies, on the other hand, may be interested in obtaining camera, radar, or LIDAR data.

The computing unit 224 may provide content to the display screens 210A and 210B for presentation. The computing unit may be a mobile computing device containing a mobile operating system (OS), such as an ANDROID® or iOS® operating system. The computing unit 224 may be built with a central processing unit (CPU) that operates in low-power environments. Because of this, the computing unit may receive a voltage that is lower than the voltage supplied by a vehicle battery or accessory circuit. This may be achieved by the one or more DC converters from the power source unit 240. The computing unit 224 may include storage to store content for presentation or may receive content from an external storage source over a network, such as the network 130. The computing unit 224 may connect to multiple sub-displays within the display screens 210A and 210B using a plurality of serial port connections. Data from the computing unit 224 may be transmitted to a sub-display using a serial cable, and from that sub-display to additional sub-displays within the display screen. The computing unit 224 may have one or more connection slots, such as flat cable connection slots, in order to transmit data to the display screens 210A and 210B. The computing unit 224 may have one or more serial ports for transmitting and receiving data. The computing unit 224 may receive information from the sensing unit 230 at the receiving port and use the received information to dynamically adjust playback of content. The computing unit 224 may transmit collected data from the route to an external application or service.

The diagnosis unit 228 enables inspection of the components of the display unit 120. The diagnosis unit 228 may be a circuit board including terminals that connect in parallel with the various components of the display unit 120, in order to measure voltages across the components. For example, the diagnosis unit 228 may measure the supplied voltage, the voltage across the fan, the power to the computing unit 224, and the voltage across the serial terminals of the computing unit 224. The diagnosis unit 228 may also display the values received from sensors within the sensor unit 230, for example, by illuminating LEDs corresponding to the received sensor data. For example, the diagnosis unit may illuminate a black LED to signify a low temperature reading.

The display unit can be attached to the roof-rack of the vehicle.

Figure 2C:
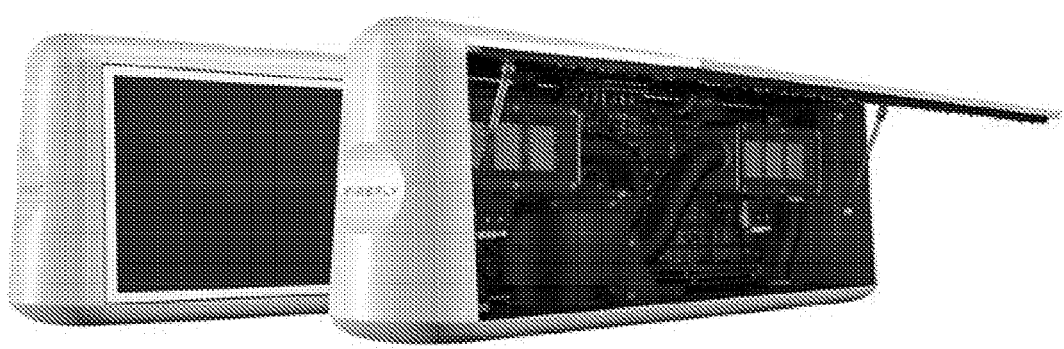
FIGS. 2C-F show multiple views of the display unit.
Figure 2D:
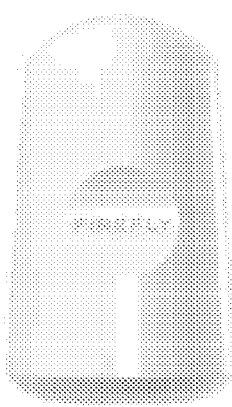
Figure 2E:
Figure 2F:
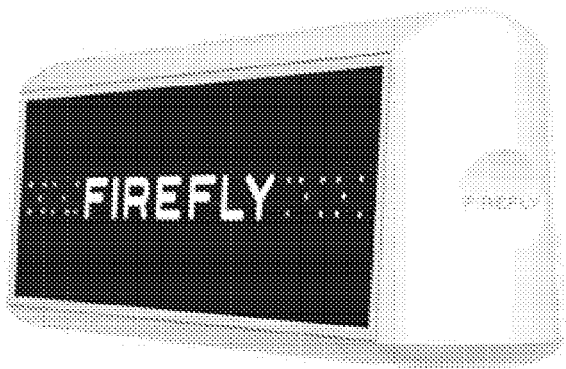

FIGS. 2C-F show multiple views of the display unit 120. FIG. 2C shows an oblique view of the display unit 120, as well as a view of electronic components inside the display unit 120. These electronic components may include the electronic components described in FIG. 2B. FIGS. 2D, 2E, and 2F show different views of the exterior of the display unit 120. FIG. 2D shows a side view. FIG. 2E shows a front view. FIG. 2F shows an oblique view.

Figure 3:
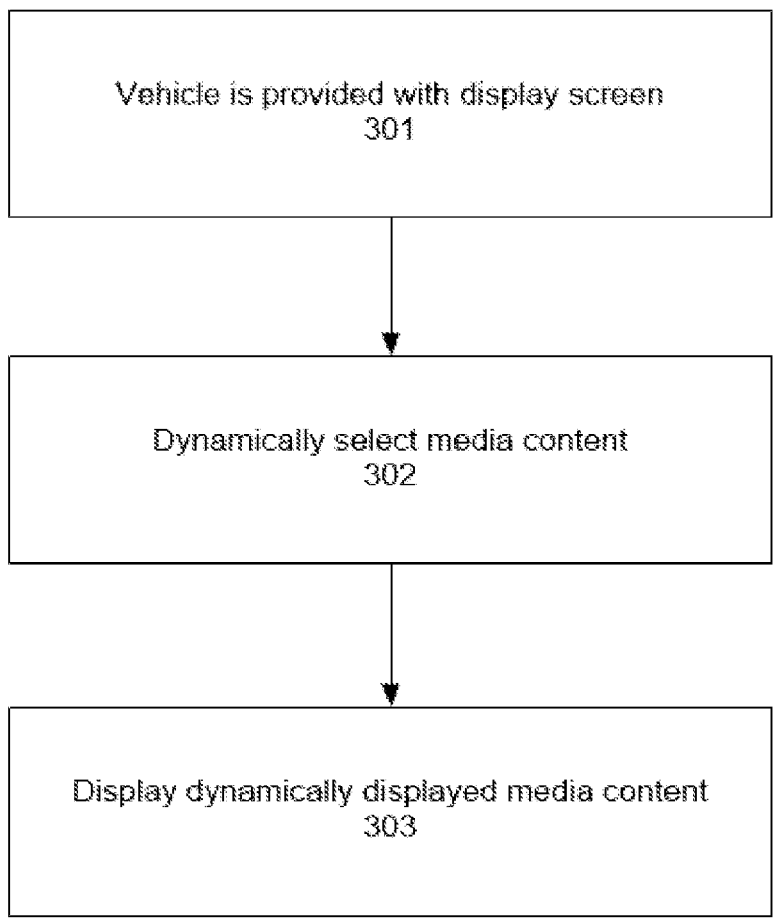
FIG. 3 shows an example of a method for displaying media content on the vehicle.

FIG. 3 shows an example of a method 300 for displaying media content on the vehicle 110. The process is implemented in a system including the vehicle 110 and the display unit 120.

In a first operation 301, the vehicle 110 is provided comprising a display screen on an exterior portion of the vehicle. The display screen may be purchased by or licensed to the owner of the vehicle. The display screen may be part of the display unit 120, also including the controller 220, the sensor unit 230, the power source unit 240, and the storage unit 250.

Next, in a second operation 302, the media content is dynamically selected by the controller 220 while the vehicle 110 is travelling along a route. The dynamically selected media content may be loaded by the controller onto the display screen via the storage unit 250, or it may be streamed from a computing device connected to a network, such as the network 130, and electronically coupled to the display screen. Individual content items may be manually selected (e.g., selected by the driver, an operator of the vehicle 110, or a passenger) or periodically selected (e.g., randomly or from a premade queue) according to a time interval. If individual content items are manually selected, they may still dynamically adjust in response to sensor events. In addition, the media content may be selected in response to events triggered when the display unit receives sensor data. The media content may originate from one or more content providers that have purchased one or more time intervals in which the display unit 120 streams their content to external audiences along the route. Depending on the route, different media content may be loaded into the display unit 120 or streamed by the display unit 120.

The controller 220 may select the media based in part on the speed, velocity, or acceleration of the vehicle along the route, or environmental or contextual factors along the route. Information on motion, contextual, or environmental factors may be collected by one or more sensors within the sensor unit 230. For example, motion information may be collected by an accelerometer, a gyroscope, or both. Environmental or contextual factors may be collected by a global positioning system (GPS), a light sensor, a particle sensor, a photo or video camera, or another sensing device. Contextual factors may include the geographic location of the vehicle, the time of day, traffic conditions, ambient lighting, weather conditions, places of interest and entertainment venues. Places of interest may include apartments, hotels, museums, restaurants, parks, shopping centers, and bars.

Next, in a third operation 303, the media content dynamically selected by the controller 220 is displayed on the display screen 210. The media content is viewable by an audience external to the vehicle 110. The controller 220 directs playback of the dynamic media content and may select additional content items after the current content has finished playback. The controller 220 may select a piece of media content in response to the collected environmental and contextual data. The controller 220 may select content for display based on a hierarchy of environmental or contextual data. For example, positioning data may be classified as more important than air pollution data or light pollution data. When the vehicle reaches a particular landmark or region, an item with content matching the geographic region may be selected. The controller may also select based on a weighting of the environmental or contextual data. The controller 220 may weight environmental and contextual factors, such as positioning, pollution, lighting, traffic, velocity, and other data, and use the weighted factors in an algorithm to select content to display, based on the characteristics of the content. Example algorithms used to select content may be machine learning algorithms. The controller 220 may predict different external audiences corresponding to different sections of the route, according to logged historical route data and sensor data from the sensor unit 230. Content items may be matched to the predicted external audiences and presented based on their degrees of matching to predicted external audiences at different points along the route. For example, in a geographic area that gets crowded during rush hour, the controller may select content advertising public transit close to the area. Within an area at night containing popular nightlife attractions, the controller 220 may select content advertising popular hotels. The controller 220 may select the data based on instructions from a content provider, as specified by input instructions through a self-service portal for content providers.

The controller 220 may modify the playback of media content in response to retrieved data in real-time or near real-time. The controller 220 may program specific events to occur in response to receiving data from sensors. For example, the controller 220 may respond to a change in acceleration, retrieved from accelerometer or gyroscope data, by changing the speed or direction of objects within the content. For example, in response to a vehicle braking sharply, an ad displaying moving text may cause the text to bounce or collide with the side of the display and sharply reverse direction. In response to pollution or decreased visibility, a content item may darken. In response to glare detected by a camera or light sensor, a content item may darken. The controller 220 may slow down or speed up playback of a content item when the vehicle moves at a faster or slower velocity.

Figure 4:
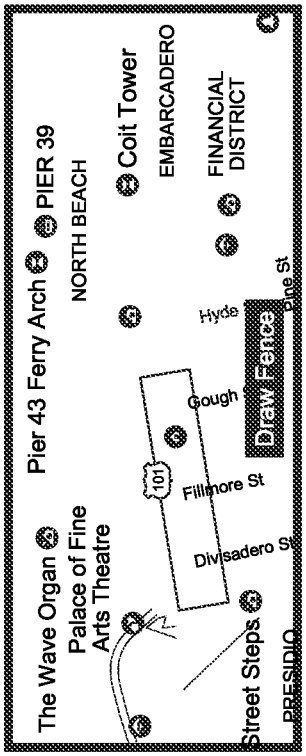
FIG. 4 schematically illustrates a self-serve portal for content providers.

FIG. 4 is a diagram of a self-serve portal 400 for content providers. The self-serve portal allows a content provider to purchase a content presentation opportunity. The portal may allow a provider to upload content for presentation. Once the content is uploaded, the content provider may choose date and time ranges in which the content is to be presented. For example, a date range may be Aug. 17, 2017-Aug. 18, 2017, and a time range within that date range may be 5:00 PM-11:00 PM. In FIG. 3, one date range and associated time range is presented, but multiple non-contiguous date and time ranges may be chosen. The content provider may also choose a coverage zone bounding an area in which the content is to be presented. The content provider may choose one or more coverage zones, which may or may not be contiguous. When determining the coverage zone or zones, the content provider may be provided with information about the size of the zone, the purchase price for presenting content within the zone, and the size of the potential audience that will view the content as it drives along the route. The content provider may also choose a method to purchase the content presentation opportunity. The content presentation opportunity may be purchased electronically, using a credit card, debit card, payment service, or electronic check. The provider may be billed proportionally to the time period in which the content is presented, the area, the number of content presentations over the duration of the content presentation opportunity, the length and type of content presented, or some combination of these factors.

Figure 5:
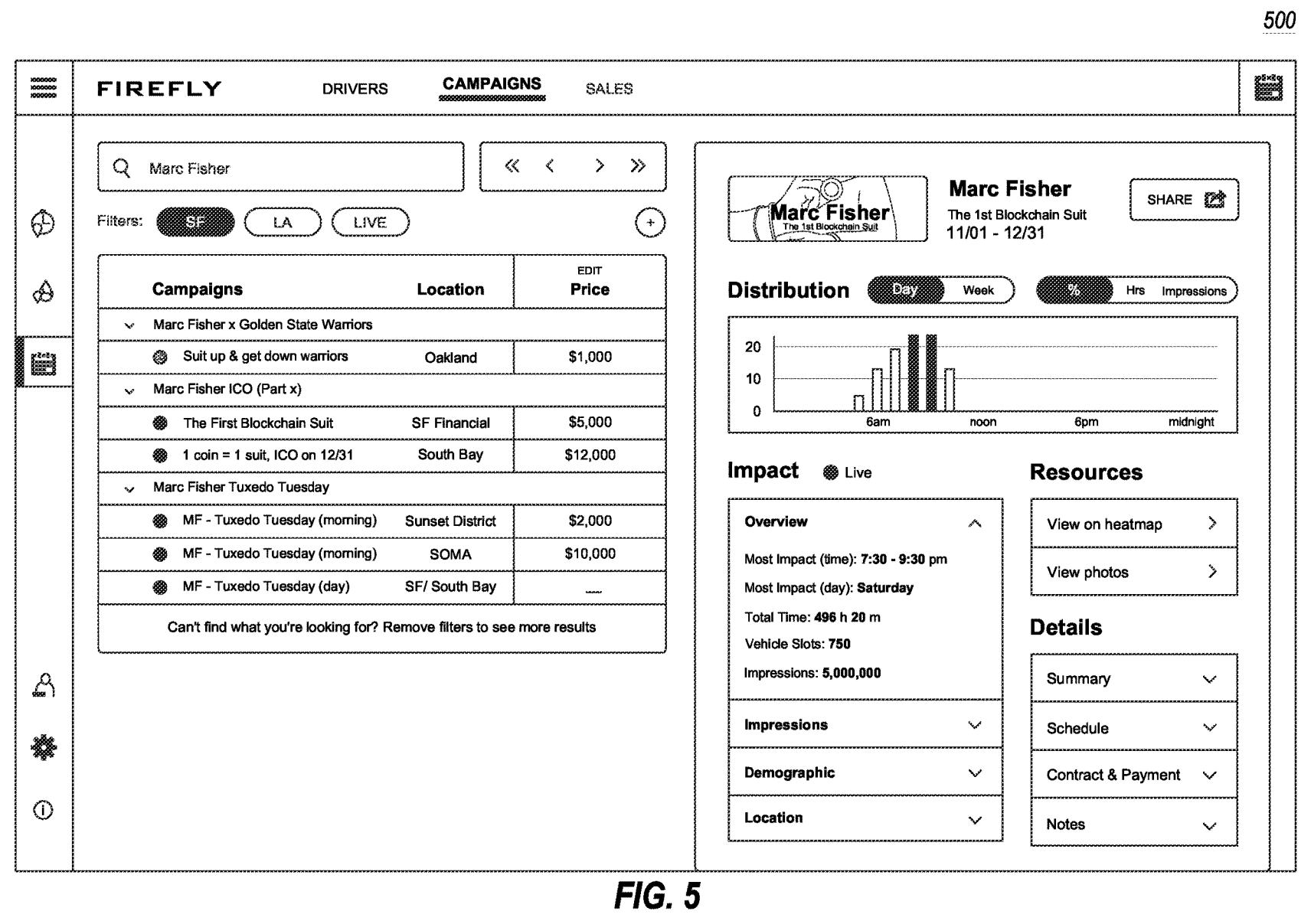

FIG. 5 shows an analytics portal 500 that allows content providers to receive data about content presentation statistics. The analytics portal 500 may show statistics for content groupings, including where the content is being presented and the price charged per piece of content in each grouping. The analytics portal 500 may show a distribution of impressions of content played during a selected duration. The analytics portal 500 also may designate a time period with the largest number of content presentations, a day with the largest number of content presentations, the number of vehicles presenting the content, the demographics of the audience being shown the content, and other data. The analytics portal 500 also may present to content providers a map showing how many drivers are currently presenting their content as well as the locations of the drivers presenting the content.

The analytics portal 500 may also display hardware information. The analytics portal 500 may display information about the display unit 120, including the type of board, screen, fan, and when the display unit 120 was last inspected. The analytics portal may also display information about how often the vehicle 110 was driven within a selected time period.

Figure 6:
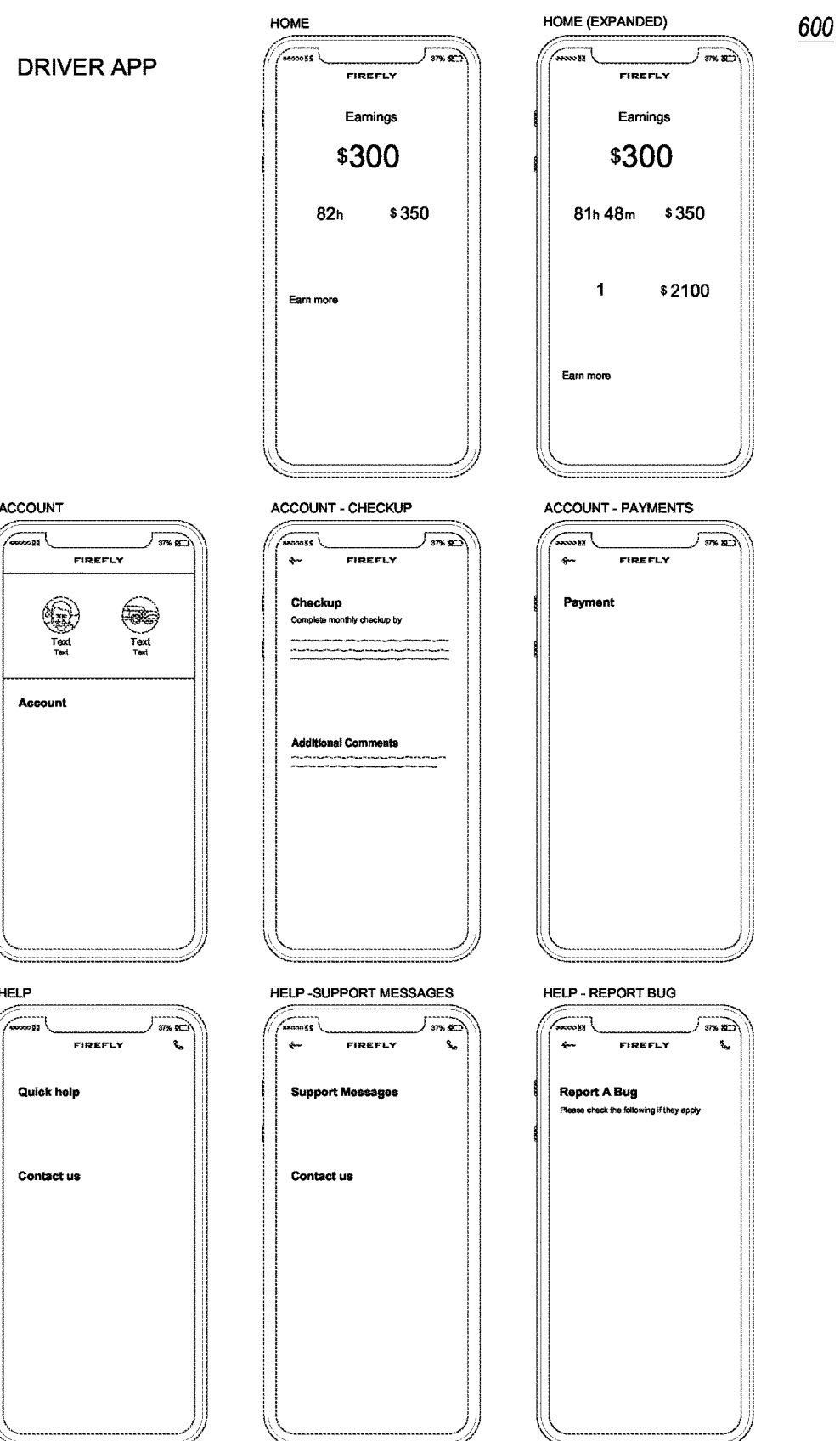
FIG. 6 shows multiple views of a mobile application that may be used by a driver renting a display unit.

FIG. 6 shows multiple views of a mobile application 600 that may be used by a driver renting a display unit. The driver may be a commercial vehicle driver, a person with a private car who performs ridesharing activities, a taxicab driver, or a bus driver. Upon purchasing the display unit, the owner of the vehicle may mount the display unit to his or her vehicle and earn money by displaying content to external audiences as he or she drives along a route. The mobile application may upload data obtained along the route from the sensors in the display unit, which may be seen by content providers. Within the application, a driver may view a total amount earned to date, as well as target earnings and methods to earn more money. A driver may also be able to report bugs or issues through the application and receive support for dealing with the reported issues.

Cameras

As mentioned above, the sensor unit 230 of the display unit 120 can have one or more cameras. The cameras can be disposed outside of the display unit 120 (e.g., on the roof or roof-rack of the vehicle on which the display unit 120 is installed), or they can be integrated into the display unit 120. The cameras can be integrated into the sides or top of the display unit 120. In some cases, the cameras can include a camera with a fish-eye lens located in the top of the vehicle. Together or separately, the cameras can generate a 360-degree view of the environment of the vehicle.

In some cases, the sensor unit 230 can instead have other types of imaging device such as infrared cameras, radar systems, LIDAR systems, or the like. Such imaging devices can perform some or all of the same functions described below.

The cameras can obtain images or video of the environment of the vehicle. The video can provide useful contextual information about (i) demographic groups in particular locations at particular times and (ii) advertising impressions.

For example, the video can indicate the age, gender, race, or nationality of people in the vicinity of the vehicle. Additionally, the video can indicate what clothing those people wear, what products (e.g., backpacks, purses, mobile devices, strollers, vehicles) they use, whether they have children or pets, and whether they are in a relationship (e.g., based on whether they are holding hands with another person), to name a few examples.

Machine learning or computer vision algorithms implemented on the display or a remote server can process the video to provide these insights. For example, a machine learning algorithm can be configured to predict the age or classify the gender or race of a person in the video. A different machine learning or computer vision algorithm can be trained to classify products that people in the vicinity of vehicle are carrying. Such a machine learning algorithm or computer vision algorithm can classify the products by type (e.g., mobile device, backpack, etc.) or by brand (e.g., for products classified as a mobile device, whether the mobile device is an Android or Apple device). Other machine learning algorithms can be configured to predict whether a person in the video has children, pets, or a partner, e.g., based on the person's physical proximity to children, pets, or other people in the video. Still other machine learning algorithms can be configured to predict the occupation of a person in the video. Such machine learning algorithms can use features like the person's clothing, products, and walking direction to make such a prediction.

The machine learning algorithms can be supervised, semi-supervised, or unsupervised. A supervised machine learning algorithm can be trained using labeled training inputs, i.e., training inputs with known outputs. The training inputs can be provided to an untrained or partially trained version of the machine learning algorithm to generate a predicted output. The predicted output can be compared to the known output, and if there is a difference, the parameters of the machine learning algorithm can be updated. A semi-supervised machine learning algorithm can be trained using a large number of unlabeled training inputs and a small number of labeled training inputs. An unsupervised machine learning algorithm, e.g., a clustering algorithm, can find previously unknown patterns in data sets without pre-existing labels.

One example of a machine learning algorithm that can perform some of the functions described above, e.g., making classifications and predictions based on video data, is a neural network. Neural networks can employ multiple layers of operations to predict one or more outputs, e.g., the age of a person, from one or more inputs, e.g., frames of video of the person. Neural networks can include one or more hidden layers situated between an input layer and an output layer. The output of each layer can be used as input to another layer, e.g., the next hidden layer or the output layer. Each layer of a neural network can specify one or more transformation operations to be performed on input to the layer. Such transformation operations may be referred to as neurons. The output of a particular neuron can be a weighted sum of the inputs to the neuron, adjusted with a bias and multiplied by an activation function, e.g., a rectified linear unit (ReLU) or a sigmoid function.

Training a neural network can involve providing inputs to the untrained neural network to generate predicted outputs, comparing the predicted outputs to expected outputs, and updating the algorithm's weights and biases to account for the difference between the predicted outputs and the expected outputs. Specifically, a cost function can be used to calculate a difference between the predicted outputs and the expected outputs. By computing the derivative of the cost function with respect to the weights and biases of the network, the weights and biases can be iteratively adjusted over multiple cycles to minimize the cost function. Training can be complete when the predicted outputs satisfy a convergence condition, such as obtaining a small magnitude of calculated cost.

Convolutional neural networks (CNNs) and recurrent neural networks can be used to classify or make predictions from images or video. CNNs are neural networks in which neurons in some layers, called convolutional layers, receive pixels from only small portions of an image or video. These small portions may be referred to as the neurons' receptive fields. Each neuron in such a convolutional layer can have the same weights. In this way, the convolutional layer can detect features, e.g., shapes or edges, in any portion of the input image.

RNNs, meanwhile, are neural networks with cyclical connections that can encode dependencies in time-series data, e.g., video frames. An RNN can include an input layer that is configured to receive a sequence of time-series inputs. An RNN can also include one or more hidden recurrent layers that maintain a state. At each time step, each hidden recurrent layer can compute an output and a next state for the layer. The next state can depend on the previous state and the current input. The state can be maintained across time steps and can capture dependencies in the input sequence. Such an RNN can be used to encode times-series features of a video.

One example of an RNN is a long short-term memory network (LSTM), which can be made of LSTM units. An LSTM unit can be made of a cell, an input gate, an output gate, and a forget gate. The cell can be responsible for keeping track of the dependencies between the elements in the input sequence. The input gate can control the extent to which a new value flows into the cell, the forget gate can control the extent to which a value remains in the cell, and the output gate can control the extent to which the value in the cell is used to compute the output activation of the LSTM unit. The activation function of the LSTM gate can be the logistic function.

Other examples of machine learning algorithms that can be used to process video data are regression algorithms, decision trees, support vector machines, Bayesian networks, clustering algorithms, reinforcement learning algorithms, and the like.

The demographic information gleaned from the videos can be used to generate equivalent or substantially equivalent target and control groups of people. A target group can be a group of people who had an opportunity to view an advertisement on a display on a vehicle. A control group can be a demographically similar or identical group of people who did not have an opportunity to view the advertisement. Companies can measure the effectiveness of the advertisement by comparing (i) the engagement of the target group with the product, service, or message was that the subject of the advertisement to (ii) the engagement of the control group. The measure can be more accurate when the target group and the control group are demographically identical or substantially identical. The video collected by the vehicle, which can provide detailed demographic information about people in the vicinity of the vehicle, can aid in generating these identical target and control groups.

The information about products that people use can be used to do targeted advertising. For example, if the video data reveals that many people in a particular location at a particular time use a particular brand of backpack, the display can advertise other products made by the company that makes the brand of backpack.

The video can also be used to more accurately measure advertising impressions. To that end, the cameras can obtain video of people's faces and gazes. Thereafter, gaze-tracking algorithms can be used to process the video data to determine whether people in the vicinity of the vehicle actually viewed an advertisement on the vehicle's display. This data can be used to more accurately count the number of people who viewed an advertisement. A true count of people who viewed an advertisement can be used to compute a more accurate effectiveness metric of the advertisement than a count of people who simply had an opportunity to view the advertisement but may or may not have actually viewed it.

Gaze tracking algorithms can use geometric or statistical techniques to determine whether a person is looking a camera. In some cases, the camera may contain a particular type of LED that shines a light at the pupil and measures reflections. Geometric techniques can involve the use of two or more cameras. Statistical techniques can involve the use of, for example, convolutional neural networks trained on a data set comprising video or images of people looking at particular points. Gaze tracking algorithms are discussed in detail at https://arxiv.org/ftp/arxiv/papers/1708/1708.01817 pdf, which is entirely incorporated herein by reference.

The video can also indicate reactions to advertisements on the display. The reactions can be used to optimize the type and form of advertisements that are shown on the display. For example, if video indicates that people are more responsive, or more often look at, advertisements with red backgrounds than blue backgrounds, the display can show advertisements with red backgrounds more often. Other aspects of advertisements, including font color, font size, and length, can be optimized in the same way.

Responsiveness to advertisements can he measured using one or more facial models. The facial models can be configured to predict a person's emotional response to an advertisement. For example, the facial models can classify a person as being happy, sad, or angry in response to viewing an advertisement. The facial model can use as features the facial features or expressions of the person, e.g., laughing, smiling, frowning, or scoffing. The facial model can be one of the machine learning algorithms described above, e.g., a neural network.

To optimize the type or form of an advertisement, the camera can obtain a large set of data comprising various advertisements and corresponding view rates and/or reactions to the advertisements. Each advertisement can be defined by a plurality of parameters, e.g., background color, font color, font size, length, and the like. Each advertisement can be associated with a view rate and a plurality of reactions. This data can be used, for example, to create a multiple-regression model or train a machine learning algorithm to optimize the parameters of an advertisement. The machine learning algorithm can be any of the machine learning algorithms described herein. In some cases, an advertisement selection algorithm can be adjusted or retrained as new impression and reaction data becomes available.

Tracking User Engagement Using Credit Card Identifiers

The display unit of FIG. 2 can be installed in taxis that accept credit cards. In some cases, a rider may see an advertisement on the display unit as he is entering a taxi and then swipe his credit card to pay for the taxi. The business responsible for the advertisement can track whether that user then uses that credit card at the business, which can indicate a conversion based on the advertisement.

Use of Mobile Location Data to Track Conversions/Engagements

Location-based mobile data can be used to track customer conversions or engagements. The display unit can maintain a log of the advertisements it displayed in particular locations at particular times. Location data from mobile phones can be used to determine which people were in the vicinity of the display at the time and therefore had an opportunity to view the display and the advertisement.

The mobile data can then be used to determine, for example, if those people, within a specified time period, visited a store or other location selling the product or service that was the subject of the advertisement on the display. In some cases, other phone data may be available. For example, in addition to a person's location, the person's online activity may be available. If a person saw an advertisement for a product and then online shopped for that product, that may be considered an engagement or a conversion. This location-based and other mobile data may be obtained from third-parties, or it can be provided by the user directly to the company responsible for the advertisement. This method of determining customer engagement can be used in conjunction with any of the other methods described herein.

Figure 8:
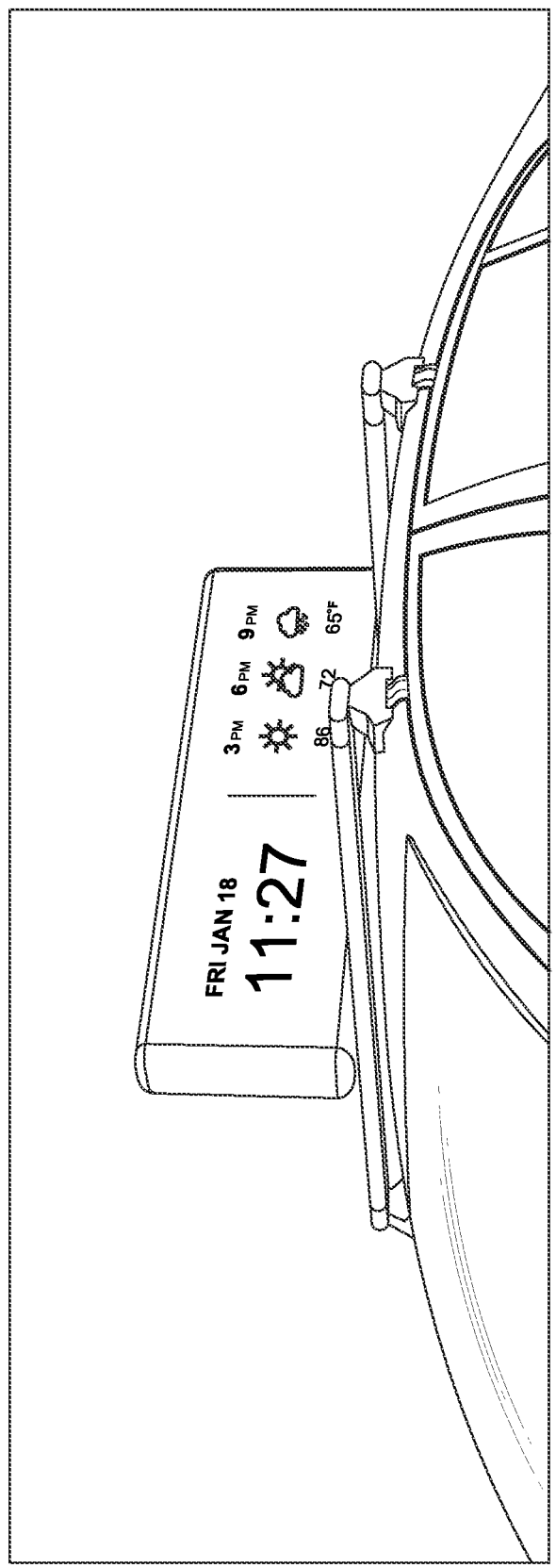
FIG. 8 illustrates another display unit.

FIG. 8 shows a second implementation of the display unit. As depicted in FIG. 8, the display unit can have a length of at least about 0.7 meters (m), 0.8 m, 0.9 m, 1.0 m, 1.1 m, 1.2 m, 1.3 m, 1.4 m, 1.5 m or more. In one implementation, the display unit can have a length of 1.182 m. The display unit can have a height of at least about 0.1 m, 0.2 m, 0.3 m, 0.4 m, 0.5 m, or more. In one implementation, the display unit can have a height of 0.372 meters. The display unit can have a width of at least about 0.05, 0.1, 0.15, 0.2 meters. In one implementation, the display unit can have a width of 0.12 meters.

The display unit can have a thin bezel such that the screens of the display unit occupy 80-100% of the largest faces of the display unit. In one implementation, the screen can have a length of 1.120 m and a height of 0.320 m. The screen can be a unitary piece, or it can be made of several panels. For example, the screen can be made of 2, 3, 4, 5, 6, 7, 8, 9, 10 or more panels of equal or unequal size.

The display unit can be configured to attach to the bars of a standard roof rack.

Computer Systems

Figure 7:
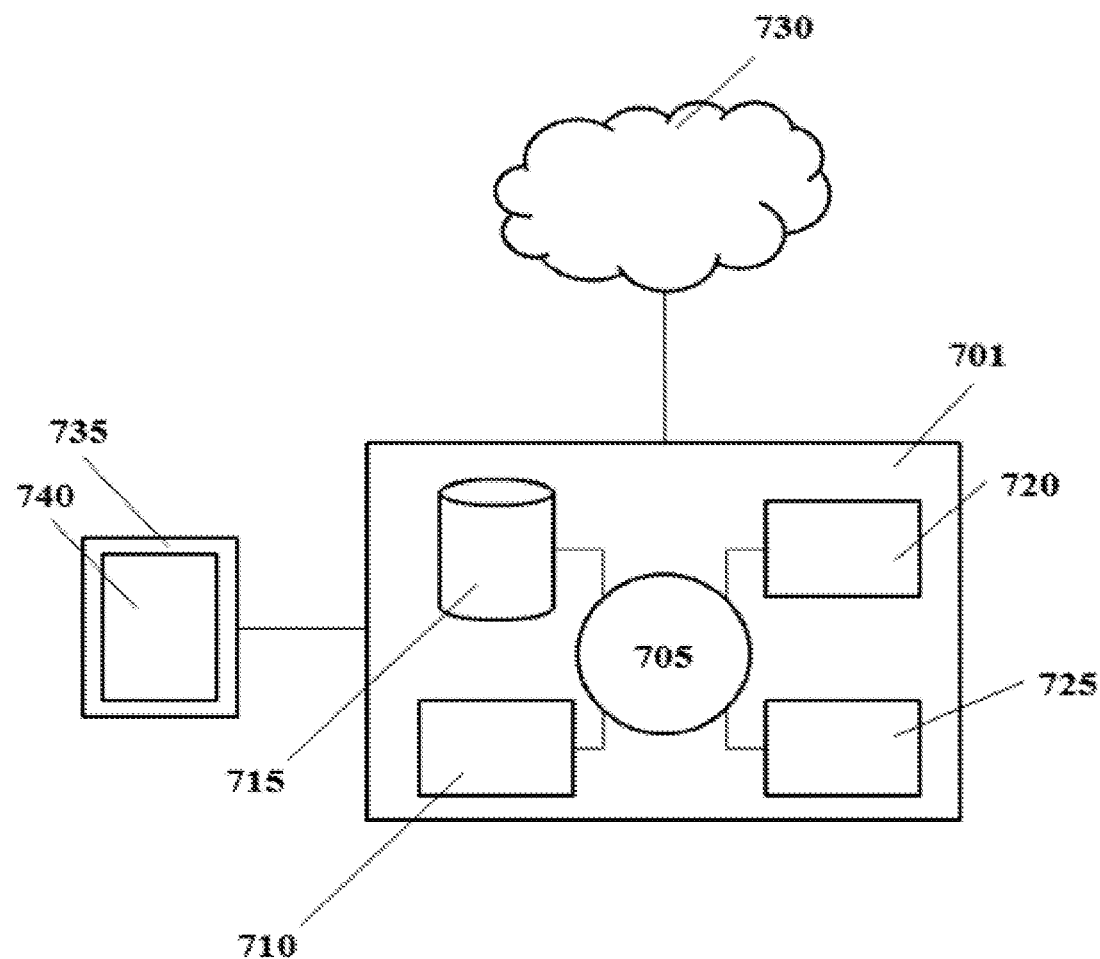
FIG. 7 shows a computer system that is programmed or otherwise configured to implement methods provided herein.

The present disclosure provides computer systems that are programmed to implement methods of the disclosure. FIG. 7 shows a computer system 701 that is programmed or otherwise configured to process various types of data collected from sensors and dynamically select content for display by the display unit. The computer system 701 can regulate various aspects of data collection, prediction, and content selection of the present disclosure, such as, for example, storing data from sensors, storing content, and selecting data for presentation. The computer system 701 can be an electronic device of a user or a computer system that is remotely located with respect to the electronic device. The electronic device can be a mobile electronic device.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 1101 can communicate with a remote computer system of a user (e.g., a member of the external audience). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1101 via the network 730.

Methods as described herein can be implemented by way of machine (e.g., computer processor) executable code stored on an electronic storage location of the computer system 701, such as, for example, on the memory 710 or electronic storage unit 715. The machine executable or machine-readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (ER) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UT) 740 for providing, for example, content providers to view analytics. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm can, for example, use sensor data to select content for presentation.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method, comprising:
   (a) displaying media content on a display unit mounted to a vehicle during a first time period as the vehicle moves from a first geographic location to a second geographic location, the display unit including a screen and at least one camera integrated into the screen and configured to generate a 360 degree view of the environment surrounding the vehicle as it moves from the first geographic location to the second geographic location;
   (b) obtaining with the at least one camera a video of the 360 degree view of the environment surrounding the vehicle as it moves from the first geographic location to the second geographic location;
   (c) processing said video with a gaze-tracking algorithm to identify at least one subject in the environment surrounding the vehicle and within a vicinity of the screen and to determine whether said at least one subject looked at said screen during said first time period.

2. The method of claim 1, wherein said gaze-tracking algorithm comprises a machine learning algorithm.

3. The method of claim 2, wherein said machine learning algorithm comprises a convolutional neural network.

4. The method of claim 1, wherein said gaze-tracking algorithm employs geometric techniques.

5. The method of claim 1, further comprising, repeating (a) to (c) for a plurality of subjects other than said subject and determining an impression rate for said media content.

* * * * *